US008503629B2

(12) United States Patent
Strope et al.

(10) Patent No.: US 8,503,629 B2
(45) Date of Patent: *Aug. 6, 2013

(54) COMPUTING DEVICE WITH REMOTE CONTACT LISTS

(75) Inventors: Brian Strope, Palo Alto, CA (US); Francoise Beaufays, Mountain View, CA (US); Hy Murveit, Portola Valley, CA (US)

(73) Assignee: Google Inc., Mountain View, CA (US)

( * ) Notice: Subject to any disclaimer, the term of this patent is extended or adjusted under 35 U.S.C. 154(b) by 226 days.

This patent is subject to a terminal disclaimer.

(21) Appl. No.: 12/732,923

(22) Filed: Mar. 26, 2010

(65) Prior Publication Data
US 2011/0235790 A1    Sep. 29, 2011

(51) Int. Cl.
*H04M 11/00*    (2006.01)
*H04L 12/16*    (2006.01)
*G06F 7/00*    (2006.01)

(52) U.S. Cl.
USPC ........................................ 379/93.24; 370/259

(58) Field of Classification Search
USPC .................. 379/93.02, 93.24, 100.08, 265.09
See application file for complete search history.

(56) References Cited

U.S. PATENT DOCUMENTS

| 6,687,362 | B1 * | 2/2004 | Lindquist et al. ........ 379/218.01 |
| 7,539,699 | B2 | 5/2009 | Kobashikawa et al. |
| 2001/0002469 | A1 * | 5/2001 | Bates et al. ...................... 707/1 |
| 2007/0143422 | A1 * | 6/2007 | Cai ............................... 709/206 |
| 2007/0201651 | A1 * | 8/2007 | Bontempi ................ 379/142.02 |
| 2007/0201661 | A1 | 8/2007 | Fullarton et al. |
| 2008/0146200 | A1 * | 6/2008 | Martin et al. .................. 455/413 |
| 2008/0317219 | A1 * | 12/2008 | Manzardo ................. 379/88.01 |
| 2009/0089308 | A1 | 4/2009 | Beadle et al. |
| 2009/0136012 | A1 * | 5/2009 | Boyd et al. ............... 379/142.15 |
| 2009/0282120 | A1 | 11/2009 | Robertson et al. |

OTHER PUBLICATIONS

"Who are my Gmail Contacts?" [online] [retrieved from the internet on Mar. 24, 2011] Retrieved from the Internet: http://googlesystem.blogspot.com/2007/12/who-are-my-gmail-contacts.html (Dec. 19, 2007) 2 pages.
"Gmail to No Longer Auto Add Contacts" [online] [retrieved from the internet on Mar. 24, 2011] Retrieved from the Internet: http://googlesystem.blogspot.com/2008/07/gmail-to-no-longer-auto-add-contacts.html (Jul. 12, 2008) 1 page.
International Search Report and Written Opinion in International Application No. PCT/US2011/029917, mailed Dec. 26, 2012, 9 pages.
International Preliminary Report on Patentability in International Application No. PCT/US2011/029917, mailed Jan. 31, 2013, 5 pages.

* cited by examiner

*Primary Examiner* — Simon Sing
*Assistant Examiner* — Solomon Bezuayehu
(74) *Attorney, Agent, or Firm* — Fish & Richardson P.C.

(57) ABSTRACT

In one implementation a computer-implemented method includes generating a group of telephone contacts for a first user, wherein the generating includes identifying a second user as a contact of the first user based upon a determination that the second user has at least a threshold email-based association with the first user; and adding the identified second user to the group of telephone contacts for the first user. The method further includes receiving a first request to connect a first telephone device associated with the first user to a second telephone device associated with the second user. The method also includes identifying a contact identifier of the second telephone device using the generated group of telephone contacts for the first user, and initiating a connection between the first telephone device and the second telephone device using the identified contact identifier.

21 Claims, 8 Drawing Sheets

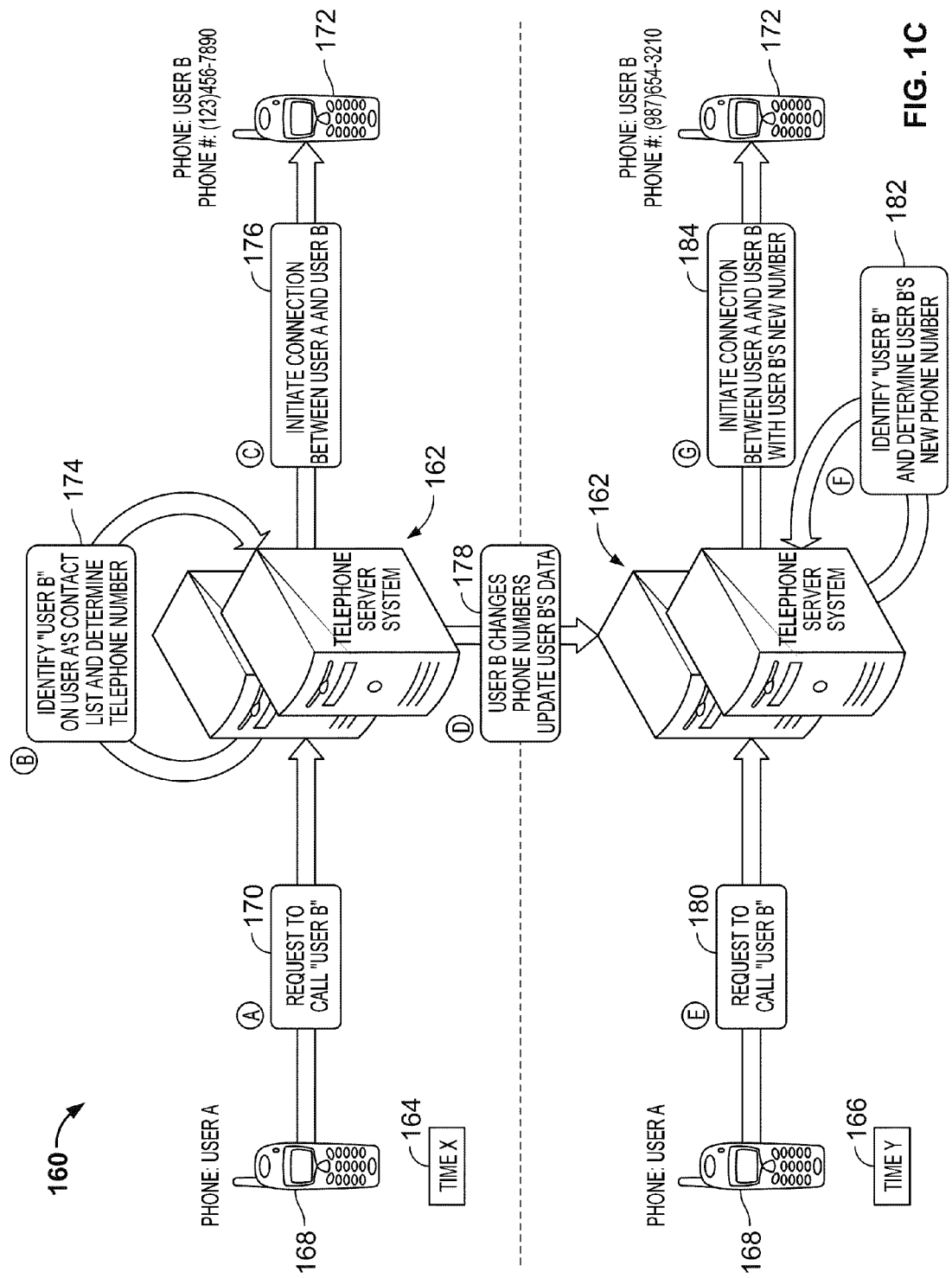

COMPUTING DEVICE WITH REMOTE CONTACT LISTS

TECHNICAL FIELD

This document generally describes techniques, methods, and systems for providing a remote list of telephone contacts.

BACKGROUND

The present disclosure generally relates to lists or other groupings of telephone contacts. A telephone contact is a data entry that correlates information that identifies a person, business, or other such entity (such as a name of a person or business) for a user, with information for contacting the entity by telephone (e.g., a classic 7 or 10-digit dialed telephone number, an internet protocol (IP) address that is used to make a voice connection, or other identifier for making a connection using a telephone). For example, an entry in a list of telephone contacts for "Alice" can be correlated with a ten-digit telephone number for Alice. The telephone contact can also include additional information, such as an e-mail address, an image of the person or business (e.g., a logo for a business), address information for the entity, and other information for the entity.

A telephone device (e.g., landline telephone, mobile telephone, etc.) can be configured to use a list of telephone contacts for a variety of tasks. For instance, a telephone device can be configured to place telephone calls using a list of telephone contacts, to send text messages using a list of telephone contacts, etc. Expanding upon the example above regarding Alice, a user can cause a telephone to initiate a telephone call to Alice at the correlated ten-digit telephone number by selecting the entry for Alice from the list of telephone contacts.

A variety of telephone devices can store lists of telephone contact locally on the telephone device. For example, a mobile telephone (e.g., a cell telephone) can store list of telephone contacts locally on the mobile telephone. A user of the mobile telephone can maintain the locally stored list of telephone contacts by adding, deleting, and modifying entries.

SUMMARY

This document describes techniques, methods, and systems for providing a list of telephone contacts that are remote from a telephone device that accesses and uses the contact information in the contacts (e.g., to dial a number of a contact automatically). In general, a remote list of telephone contacts can be provided such that a user can maintain and use the list of telephone contacts independent of the user's telephone device. More specifically, the remote list of telephone contacts can be provided in a manner such one user is able to specify the telephone contact information for another user by employing a unique identifier other than a telephone number for the other user.

For instance, an email address (an example of a unique identifier) can be used to specify the contact information for a user on a remote list of telephone contacts. Instead of specifying a telephone number for an entry in a telephone contact list, an email address can be specified by the first user. For example, an entry for "Bob" can contain Bob's email address (e.g., bob@example.com) instead of a 10-digit telephone number for Bob. When Bob's entry is selected from the list of telephone contacts, an account associated with bob@example.com can be identified and a telephone number associated with the account can be retrieved. Various permission schemes can be used to ensure that Bob has consented to receive a telephone call from another user.

A variety of techniques for generating a list of telephone contacts based upon a user's association with other users that employ the unique identifier are described. For instance, a user's association with other users through an email account can be used to identify potential entries for the list of telephone contacts. Expanding upon the example above, if Bob converses frequently over email with cindy@example.com and david@example.com using his email account bob@example.com, then cindy@example.com and david@example.com can be identified for possible addition to Bob's list of telephone contacts.

In one implementation a computer-implemented method includes generating, by a computer system, a group of telephone contacts for a first user, wherein the generating includes identifying, by the computer system, a second user as a contact of the first user based upon a determination that the second user has at least a threshold email-based association with the first user; and adding, by the computer system, the identified second user to the group of telephone contacts for the first user. The method further includes receiving, at the computer system, a first request to connect a first telephone device associated with the first user to a second telephone device associated with the second user. The method also includes identifying, by the computer system, a contact identifier of the second telephone device using the generated group of telephone contacts for the first user, and initiating, by the computer system, a connection between the first telephone device and the second telephone device using the identified contact identifier.

In another implementation, a system for placing telephone calls using a remote email address-based contact list includes one or more servers and an interface to the one or more servers that is configured to receive a first request to connect a first telephone device associated with a first user to a second telephone device associated with the second user. The system further includes a contact list management module that programmed to generate a group of telephone contacts for the first user by: identifying the second user as a contact of the first user based upon a determination that the second user has at least a threshold email-based association with the first user, and adding the identified second user to the group of telephone contacts for the first user. The system also includes a call request processing component programmed to: identify a contact identifier of the second telephone device using the generated group of telephone contacts for the first user, and to initiate a connection between the first telephone device and the second telephone device using the identified contact identifier.

In another implementation, a system for placing telephone calls using a remote email address-based contact list includes one or more servers and an interface to the one or more server systems that is configured to receive a first request to connect a first telephone device associated with a first user to a second telephone device associated with the second user. The system additionally includes a contact list management module that is configured to generate a group of telephone contacts for the first user by: identifying the second user as a contact of the first user based upon a determination that the second user has at least a threshold email-based association with the first user, and adding the identified second user to the group of telephone contacts for the first user. The system further includes means for processing the request to connect the first telephone device with the second telephone device using a generated group of telephone contacts that is configured to: identify a contact identifier of the second telephone device using the generated group of telephone contacts for the first user, and initiate a connection between the first telephone device and the second telephone device using the identified contact identifier.

Particular embodiments can be implemented to realize one or more of the following advantages. Users may be able to more easily generate and manage a list of telephone contacts over time. For instance, a list of telephone contacts can be maintained independent of a telephone device. If a user changes telephone devices, the user will be able to continue using the list of telephone contacts without having to transfer them to the new telephone device. In another example, telephone numbers associated with entries on the list of telephone contacts are automatically updated when telephone numbers change. In a further example, the list of telephone contacts can be automatically generated and updated based upon email-related information for a user.

Additionally, by using a list of telephone contacts, as disclosed in this document, a user can change his/her telephone number and continue to receive telephone calls without informing other users of the change. By using a remote list of telephone contacts, a user is able to initiate telephone calls to other users without knowing the other users' telephone numbers, regardless of whether the other users' telephone numbers have changed.

Furthermore, there can be privacy-related advantages for users of a remote list of telephone contacts. For instance, a user may be able to keep his/her telephone number "private" (not known to other users) while still receiving telephone calls from other users. Additionally, a user can be able to maintain better control over who is able to call him/her. For example, a remote list of telephone contacts permits a user to establish a sharable and temporary group of users that can call the user, subject to the user's consent. In contrast, without a remote list of telephone contacts, once a user gives out his/her telephone number, the user is no longer able to control how the telephone number is shared with, or used by, other users.

The details of one or more embodiments are set forth in the accompanying drawings and the description below. Other features, objects, and advantages will be apparent from the description and drawings, and from the claims.

DESCRIPTION OF DRAWINGS

FIG. 1C is a conceptual diagram of an example system for providing a remote list of telephone contacts when a telephone number associated with an entry on the list changes.

Like reference symbols in the various drawings indicate like elements.

DETAILED DESCRIPTION

Figure 1A:
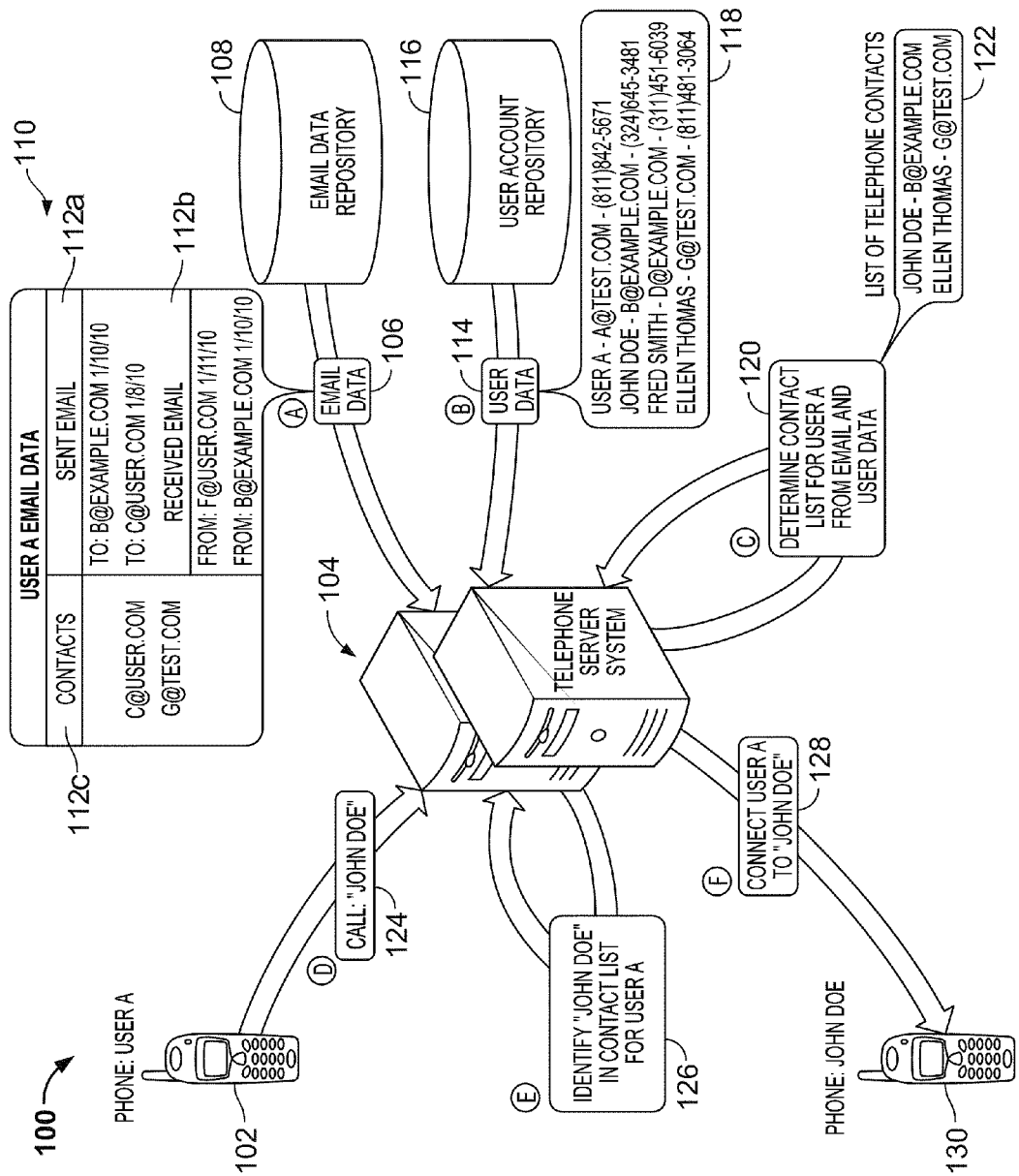
FIG. 1A is a conceptual diagram of an example system for generating and providing a remote list of telephone contacts.

This document generally describes generating and providing a list of telephone contacts that is remote from a telephone device that uses information from the contacts to make telephone calls (e.g., a mobile telephone, a voice-over-internet-protocol (VOIP) telephone, a smart telephone, a landline telephone, etc.). A remote list of telephone contacts can be stored and maintained on a server system that is separate from a telephone device. For a user to use a list of telephone contacts that is remote from the user's telephone device, the telephone device can be configured to connect automatically to the server system to access contact information and to place telephone calls using the contact information.

For example, assume that a user A has a mobile telephone and that, instead of storing contact information on the mobile telephone, the user A maintains a list of telephone contacts on a server system that is accessible by the mobile telephone over a telephone network (e.g., public switched telephone network (PSTN), 3G cellular network, and the Internet). When user A wants to place a call to user B, user A can direct the mobile telephone to connect to the server system to find an entry for user B in the list of telephone contacts. Once the entry for user B has been located, the server system can initiate a connection between the mobile telephone of user A and a telephone device of user B.

Entries in a list of telephone contacts can use a unique identifier other than a telephone number to initiate telephone call requests from a user. A telephone number is generally a number that uniquely identifies, at a given time, a single telephone device. Telephone numbers, such as a 10-digit telephone numbers used in the United States, can be difficult for users to remember. Other unique identifiers, such as an email address, can be easier to remember and associate with people. For instance, a user A may be able to remember that user B uses the email address b@example.com, instead of remembering that user B's current telephone number is 811-328-8901.

Unique identifiers other than a telephone number can be used in a list of telephone contacts for initiating telephone calls by referencing information that correlates the unique identifiers with telephone numbers. For instance, a telephone server system can allow users to establish accounts with the server system. An established account can contain a variety of information, such as a unique identifier for the user (e.g., an email address, a social network username, etc.), a telephone number (or telephone numbers) for the user, permission information regarding who is allowed to call the telephone number, etc. When a user selects an entry on the list of telephone contacts to call, the telephone server system can locate an account that is associated with the unique identifier of the selected entry and initiate a telephone call using the telephone number (or one of the telephone numbers) that is associated with the account.

For example, assume that a users A and B have created accounts on a telephone server system; that user A's list of telephone contacts includes an entry that contains user B's email address; and that user B's account includes information specifying user B's email address, user B's telephone number, and that user A is permitted to call user B. When user A connects to the telephone server system and requests initiation of a telephone call to user B, the telephone server system can use user B's email address, as specified in User A's list of telephone contacts, to identify user B's account and user B's telephone number.

For a unique identifier that is specified in a list of telephone contacts but that is not correlated with a telephone number, a telephone server system can attempt to obtain the telephone number by contacting a user who is associated with the unique identifier. Extending the example from the previous paragraph, assume that user A's list of telephone contacts further contains an email address "c@example.com" but that the telephone server system is unable to locate an account or telephone number associated with that email address. The telephone server system can send an email to "c@example.com" inviting the user to establish an account so that other users can call him/her using a remote list of telephone contacts on the server system.

Use of remote lists of telephone contacts can provide a variety of benefits to users, such as being able to maintain contact information independent of a telephone device, at a location apart from such a device. For instance, users tend to upgrade and change their mobile telephones every couple years. Manually entering the contents of a contact list stored on an old telephone into a new mobile telephone can be a tedious and time consuming task. Such a task can be eliminated using a remotely stored list of telephone contacts, because the list of telephone contacts can persist independent of a telephone device.

Users can additionally receive a variety of benefits from remote lists of telephone contacts being provided using unique identifiers other than telephone numbers, such as users not having to update entries when telephone numbers change. For example, assume that a telephone contact list for user A contains an entry for user B and that a telephone number for user B has changed. Once user B has updated his/her telephone number with the telephone server system, the telephone contact list for user A uses the new telephone number for user B without having to be updated. Such a feature can minimize a user's effort to keep and be aware of current contact information.

A list of telephone contacts for a user can be automatically generated by a telephone server system based upon connections between the user and other users. For instance, if the telephone server system uses email addresses to uniquely identify entries on a list of telephone contacts, the telephone server system can analyze email-related information to generate the list of telephone contacts.

For example, assume that user A has an email account that tracks sent email messages, received email messages, and email contact information, and stores such data on a client device and/or a server system. The telephone server system can analyze the information associated with user A's email account to identify email addresses for possible addition to a list of telephone contacts for user A. As described in more detail below, a variety of factors can be considered when identifying email addresses for addition to the list of telephone contacts, such as frequency of correspondence, presence on a list of email contacts for user A, etc.

FIG. 1A is a conceptual diagram of an example system 100 for generating and providing a remote list of telephone contacts. In the example system 100 depicted, a list of telephone contacts is generated for user A based upon user A's email interactions and email contacts. The generated list of telephone contacts is depicted as being generated and maintained by a telephone server system 104 that is remote from user A's telephone device 102. User A can use the list of telephone contacts, provided by the telephone server system 104, to call other users by connecting to the telephone server system 104 using the telephone device 102 and selecting an entry from the list.

To generate a list of telephone contacts, the telephone server system 104 can use email data 106 from an email data repository 108, as depicted by step A. The email data repository 108 can be associated with a third-party email system, such as an enterprise email system, a web-based email system, etc. The email data 106 provided to the telephone server system 104 can be redacted such that information that is not pertinent to generating a list of telephone contacts is removed.

As shown in the example depiction 110 of the email data 106 provided to the telephone server system 104, a variety of email-related information 112a-c can be used by the telephone server system 104 to generate a list of telephone contacts for user A. The depicted email-related information 112a-c includes sent email messages 112a, received email messages 112b, and email contacts 112c for user A. Other email-related information can be used to generate a list of telephone contacts, such as email-based chat logs, email-based blog postings, information regarding blocked or restricted email addresses, etc.

Additionally, the telephone server system 104 can employ user data 114 from a user account repository 116, as shown in step B. User data 114 can include information associating an email address with a telephone number for a user. For instance, an expanded depiction 118 of the user data 114 shows a name ("User A"), an email address ("a@test.com"), and a specific telephone number as being associated with and assigned to user A. The user account repository 116 can store a variety of additional information regarding users of the telephone server system 104, such as information regarding other users permitted to or blocked from calling, rules for routing calls to a user (e.g., during business hours direct telephone calls to the user's office telephone, during the evening direct telephone calls to the user's home, etc.), etc.

As shown at step C (120), the telephone server system 104 determines a list of telephone contacts for user A from the email data 106 and the user data 114. The email data 106 can be analyzed to identify other users that user A would be likely to want in the list of telephone contacts. A variety of aspects of the email data 106 can be analyzed, such as frequency of correspondence, how recently correspondence has taken place, presence on a list of email contacts, whether emails are sent to and received from another email address, etc.

For example, if user A currently corresponds frequently with a friend who corresponds to a first email address (e.g., sending and receiving emails, chatting with the first email address using an email-based instant messaging service, etc.), the telephone server system 104 can identify a first email address as likely being a contact of user A that user A would like to add to user A's list of telephone contacts. In contrast, if user A has not corresponded with a second email address for several years, the telephone server system 104 can determine that the second email address is likely to not be added to user A's list of telephone contacts.

Using the example email information 112a-c, the telephone server system 104 can identify the email address "b@example.com" as a likely contact of user A based upon user A having sent and received email messages from user A. The telephone server system 104 can additionally identify email addresses "c@user.com" and "g@test.com" as likely contacts based upon their presence in the list of email contacts for user A and an email message sent to c@user.com. However, without further information to indicate the a connection with user A, the email address "f@user.com" may be determined to not be a contact of user A based upon the single email user A received from this email address. For instance, the telephone server system 104 would not want to label the sender of an unsolicited email (e.g., spam email) as a contact of user A.

In identifying contacts of user A, the telephone server system 104 can take into account differences between how user A interacts with other users over email and telephone. For example, user A may contact a first user via email more than via telephone, and may contact a second user through telephone more than email. The telephone server system 104 can analyze user A's behavior with respect to email to telephone correspondence to more accurately identify likely telephone contacts. This analysis can be based upon the email data 106 and user A's use of the list of telephone contacts provided by the telephone server system 104.

For instance, expanding upon the previous example, the telephone server system 104 may determine that emails user A sends to the first user tend to be lengthy and detailed and that emails user A sends to the second user tend to be shorter and less detailed. Based upon this determination, the telephone server system 104 can identify that user A has a pattern of calling users to whom user A sends shorter emails more frequently than users to whom user A sends longer emails. Based upon this identified pattern, the server system 104 can predict likelihood that user A will call another user based upon email correspondence. This predicted likelihood can be used in determining whether to add an email address to user A's list of telephone contacts.

To generate the list of telephone contacts for user A, the telephone server system 104 can correlate the identified email addresses with the user data 114 identify email addresses that have corresponding telephone contact information (e.g., telephone number, account with the telephone server system 104, etc.) registered with the telephone server system 104. Email addresses for which there is corresponding telephone contact information contained in the user data 114 can be added to the list of telephone contacts for user A. Email addresses for which there is not corresponding telephone contact information can be contacted and informed of the benefits of registering their telephone information with the telephone server system 104.

For example, as indicated above, email addresses "b@example.com," "c@user.com," and "g@test.com" have been identified as contacts of user A for potential addition to the list of telephone contacts for user A. Correlating these email addresses with the example depiction 118 of user data 114, there is corresponding information for "b@example.com" and "g@test.com," but not for "c@user.com." Accordingly, entries for "b@example.com" and "g@test.com" can be added to a list of telephone contacts 122 for user A. The entries on the list of telephone contacts can include various portions of the user data 118, such as a user name corresponding to an email address (e.g., "John Doe" for email address "b@example.com").

The generated list of telephone contacts 122 for user A can be stored with the telephone server system 104 for use when serving telephone contact requests from user A. Using steps A-C, the telephone server system 104 can update the list of telephone contacts 122 on a recurring basis (e.g., once a day, once a week, once a month, etc.) and/or in response to events, such as a telephone number for an identified email address (e.g., "c@user.com") being registered with the telephone server system 104.

User A can access and revise the list of telephone contacts 122 through the telephone server system 104. For a variety of reasons, such as privacy, the information related to entries on the list of telephone contacts 122 that user A is able to access can be limited. For instance, user A can be restricted to viewing a name and an email address for an entry on the list of telephone contacts 122 (e.g., user A can be restricted from viewing a telephone number associated with entries on the list 122).

With the list of telephone contacts 122 generated, user A can connect the telephone device 102 to a mobile telephone of a contact on the list of telephone contacts 122 using the telephone server system 104. As depicted at step D, the telephone device 102 initiates a connection with the telephone server system 104 and transmits a request 124 to call "John Doe." The telephone server system 104 can provide a variety of means for the telephone device 102 to transmit the request 124, such as voice (e.g., voice recognition can be used on the telephone device 102 and/or the server system 104 to translate the verbal request), text (e.g., short message service (SMS)), data generated by an application on the telephone device 102 (e.g., a mobile telephone app), etc.

Although users can use a variety of unique information (e.g., email address, telephone number, etc.) to identify the person/entity that they wish to call in the request 124, a non-unique identifier (e.g., name) can be used. Using "John Doe" from the request 124 as an example, there may be more than one user in the user account repository 116 with the name "John Doe." To identify the correct "John Doe" for user A's request 124, the telephone server system 104 can retrieve the list of telephone contacts 122 for user A and use this list as the pool potential candidates for the request 124. By using the list of telephone contacts 122, the telephone server system 104 can decrease the amount of data to be considered when attempting to identify a match for the request 124 and increase the efficiency for serving the request 124.

As indicated at step E (126), the telephone server system 104 identifies an entry in the list of telephone contacts 122 for user A that corresponds to the request 124 for "John Doe." The telephone server system 104 can use the email address for the identified entry ("b@example.com") to locate the corresponding telephone number for "John Doe" from the user account repository 116.

In addition to identifying the telephone number for "John Doe," the telephone server system 104 can determine whether user A is permitted to call "John Doe." For example, the user account repository 116 can contain information regarding other users that are permitted to call a user through the telephone server system 104. If the calling permissions for "John Doe" indicate that user A is permitted to place telephone calls to "John Doe," then the telephone server system 104 can proceed with processing the request 124.

Furthermore, the telephone server system 104 can reference the user account repository 116 for rules associated with telephone calls to "John Doe." Rules can indicate which, of multiple telephone numbers for "John Doe," to call given the time of day, day of the week, month, etc. Rules can indicate a variety of calling restrictions, such as routing calls placed between 10:00 pm and 7:00 am directly to voicemail. Using the rules for "John Doe," the telephone server system 104 can ensure that the requested telephone call by user A is made per "John Doe's" liking.

With the correct telephone number for "John Doe" retrieved, the telephone server system 104 can initiate a connection 128 between the telephone device 102 of user A and a telephone device 130 for "John Doe." The connection between the telephone device 102 and the telephone device 130 can be implemented in a variety of ways. For example, the telephone server system 104 can use standard VOIP protocols to initiate and route telephone calls between the telephone device 102 and the telephone device 130. Session initiation protocol (SIP) and user datagram protocol (UDP) can be used to push telephone call data through hypertext transfer protocol (HTTP) media server proxies, which eventually terminate at the telephone device 102 and the telephone device 130. In some implementations where the telephone devices 102 and 130 are landline telephones, the telephone server system 104 can transmit telephone call data using VOIP protocols to the VOIP gateways on either end of the telephone call and, through the VOIP gateways, initiate the telephone call between the devices 102 and 130 using the "twisted pair" (physical connection) and local colocation system.

Although email is used as the unique identifier for the list of telephone contacts 122 in the example above, other unique identifiers that are not telephone numbers can be used. For example, the unique identifier used in the list of telephone contacts 122 can be a social network username (e.g., FACEBOOK username, TWITTER username, WORLD OF WARCRAFT username, LINKEDIN username, etc.). In such an example, the list of telephone contacts 122 can be generated by analyzing data associated with user interactions on the social network to identify potential contacts.

Additionally, the unique identifier used for the list of telephone contacts 122 can be an aggregation of unique identifiers (e.g., email addresses and social network usernames, etc.). With such aggregation, the aggregated unique identifier for a user can be a combination of the source from which the unique identifier is derived (e.g., email) and the unique identifier for the user from the source (e.g., "a@test.com").

Figure 1B:
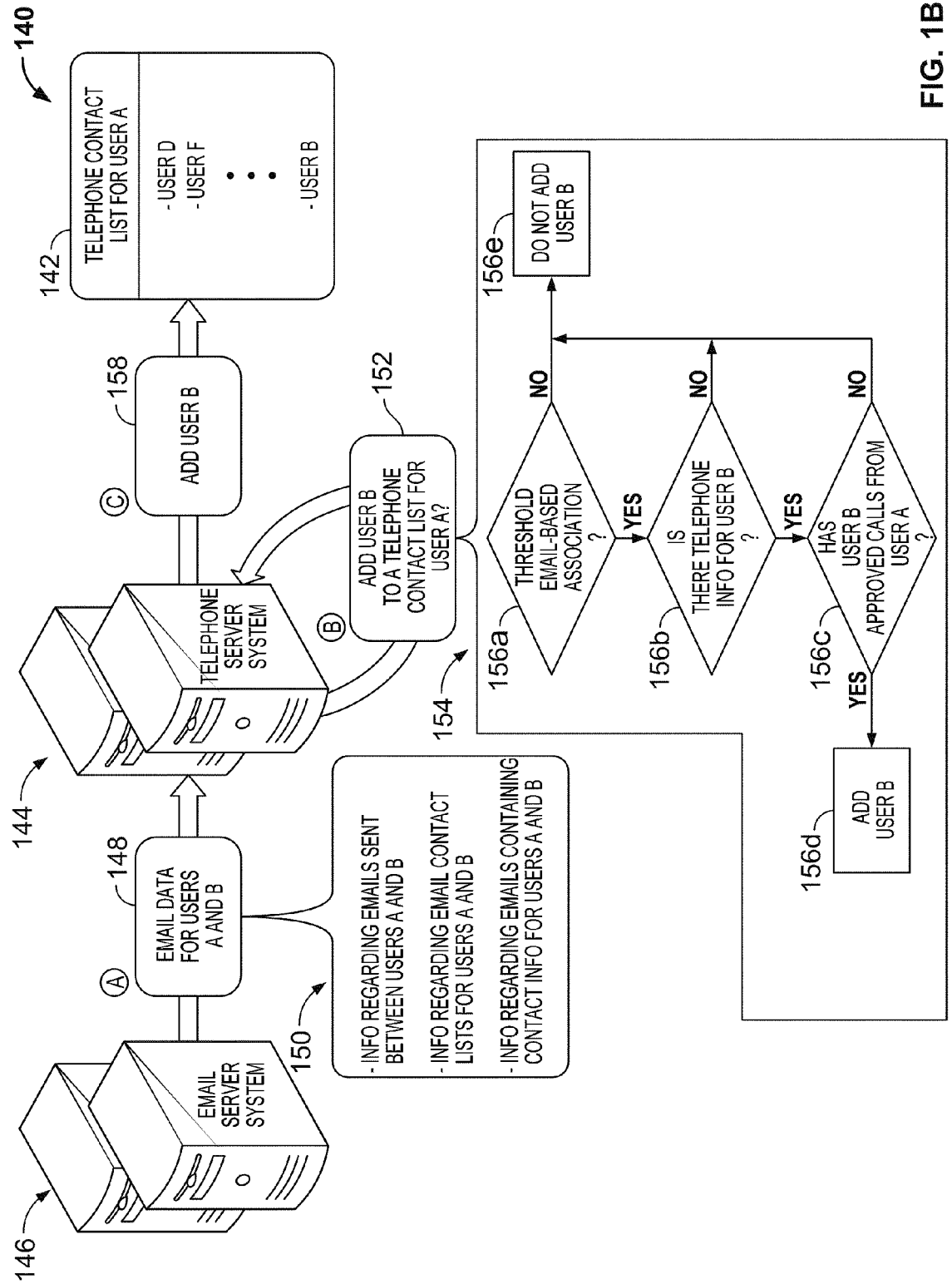
FIG. 1B is a conceptual diagram of an example system for generating a remote list of telephone contacts.

FIG. 1B is a conceptual diagram of an example system 140 for generating a remote list of telephone contacts 142. In the example system 140, a telephone server system 144 generates the list of telephone contacts 142 based upon email data from an email server system 146. The example system 140 depicts a determination made by the telephone server system 144 with respect to whether a user B should be added to the list of telephone contacts 142 for a user A. The example telephone server system 144 is similar to the example telephone server system 104, as described above with respect to FIG. 1A.

As indicated at step A (148), email data for users A and B can be provided from the email server system 146 to the telephone server system 144 for generating the list of telephone contacts 142. The email data can include a variety of information 150 related to email addresses associated with users A and B. For example, the information 150 can include information regarding emails sent between users A and B (e.g., frequency of messages sent between users A and B, average length of emails sent between user A and B, how recently emails had been sent between user A and B, etc.). The information 150 can be redacted and/or anonymized by the email server system 146 to maintain user privacy.

In another example, the information 150 can include information regarding email contact lists for users A and B. The presence of users A and B on each other's email contact list can indicate a high likelihood that user A and user B have a sufficient connection to warrant addition to the list of telephone contacts 142.

In a further example, the information 150 can include information regarding emails sent and/or received by user A containing contact information associated with user B (e.g., user B's email address, user B's telephone number, etc.) and vice versa. Such emails can indicate a connection between users A and B.

The email data 148 provided to the telephone server system 144 can include additional email-related information not specifically enumerated in the information 150. For instance, the email data 148 can include information regarding email-based chat messages (e.g., YAHOO! CHAT) sent between users A and B.

At step B (152), the telephone server system 144 can determine whether to add user B to the list of telephone contacts 142 for user A. To make this determination, the telephone server system 144 can be configured to use an example decision-logic 154 that includes steps 156*a-e*. Based upon the email data 148, the telephone server system 144 can determine whether there is a threshold email-based association between users A and B (step 156*a*). The threshold can be based upon a variety of factors, such as empirical data, email volume for user A and/or user B, analysis of a relationship between email and telephone behavior for user A, etc.

For example, a high volume of emails sent between users A and B as well as the presence of user B on user A's email contact list can indicate a strong association between the two users. In contrast, a low volume of emails between users A and B with no communication for more than six months can indicate a weak association between users A and B.

If the telephone server system 144 determines that there is a threshold email-based association (step 156*a*), then a determination can be made as to whether the telephone server system 144 has telephone contact information for user B (step 156*b*). Such a determination can involve checking whether user B has established an account with the telephone server system 144. An account can be associated with a variety of information regarding user B, such as user B's name, telephone number, list of other users permitted to contact user B, etc.

If there is telephone information for user B (step 156*b*), then the telephone server system 144 can determine whether user B has approved telephone calls from user A (step 156*c*). Such a determination can be made by examining an account associated with user B to identify whether user A has already been approved by user B. If user A has not been approved, then the telephone server system 144 can contact user B seeking permission.

If user B has approved calls from user A (step 156*c*), then user B can be added to the list of telephone contacts 142 for user A (step 156*d*). If user B has not approved calls from user A, then user B may not be added to the list of telephone contacts 142 (step 156*e*). Similarly, if there is not a threshold email-based association between users A and B (step 156*a*) or if there is not telephone information for user B (step 156*b*), then user B may not be added to the list of telephone contacts 153 (step 156*e*).

In the depicted example system 140, user B is added to the list of telephone contacts 142 for user A, as indicated by step C (158). The list of telephone contacts 142 can be updated at various times by the telephone server system 144, during which entries can be added, updated, and/or removed from the list of telephone contacts 142.

FIG. 1C is a conceptual diagram of an example system 160 for providing a remote list of telephone contacts when a telephone number associated with an entry on the list changes. In the system 160, a telephone server system 162 provides a list of telephone contacts for user A, which includes an entry for user B. A telephone number for user B changes from time X 164 to time Y 166. However, as depicted in the example system 160, user A is able to call user B using the telephone server system 162 without having to modify the list of telephone contacts or even know about the changed telephone number. The telephone server system 162 is similar to the telephone server systems 104 and 144 described above with regard to FIGS. 1A and 1B, respectively.

Using a telephone device 168, user A transmits a request to call "User B" to the telephone server system 162 at time X 164 (170). The telephone server system 162 identifies a unique identifier (e.g., email address, social network username, etc) for user B from user A's list of telephone contacts and determines a telephone number for user B's telephone device 172 using the identified unique identifier (174). Using the determined telephone number for user B's telephone device 172, the telephone server system 162 initiates a connection between user A's telephone device 168 and user B's telephone device 172 (176).

In the depicted example, user B changes his/her telephone number between time X 164 and time Y 166. Accordingly, user B updates his/her telephone number with the telephone server system 162 to reflect user B's new telephone number (178). Such updating can affect data that correlates a unique identifier for user B (e.g., user B's email address) with user B's telephone number. This updating can leave the list of telephone contacts for user A unchanged—the list of telephone contacts for user A can include user B's unique identifier, which can be used to reference the correlating data to obtain user B's telephone number.

At time Y 166, user A transmits a request 180 from the telephone device 168 to the telephone server system 162 to call "User B." In this example, the request 180 is the same as the request 170 transmitted at time X 164. In response to the request 180, the telephone server system 162 identifies user B on user A's list of telephone contacts and determines the telephone number for user B (182) using the same operations as in step 174 at time X 164. However, since data correlating user B's unique identifier and telephone number has been updated between times X 164 and Y 166, the telephone number determined for user B through this operation will be the new telephone number for user B. Using this new telephone number, the telephone server system 162 initiates a connection between user A and user B with user B's new telephone number (184).

Figure 2:
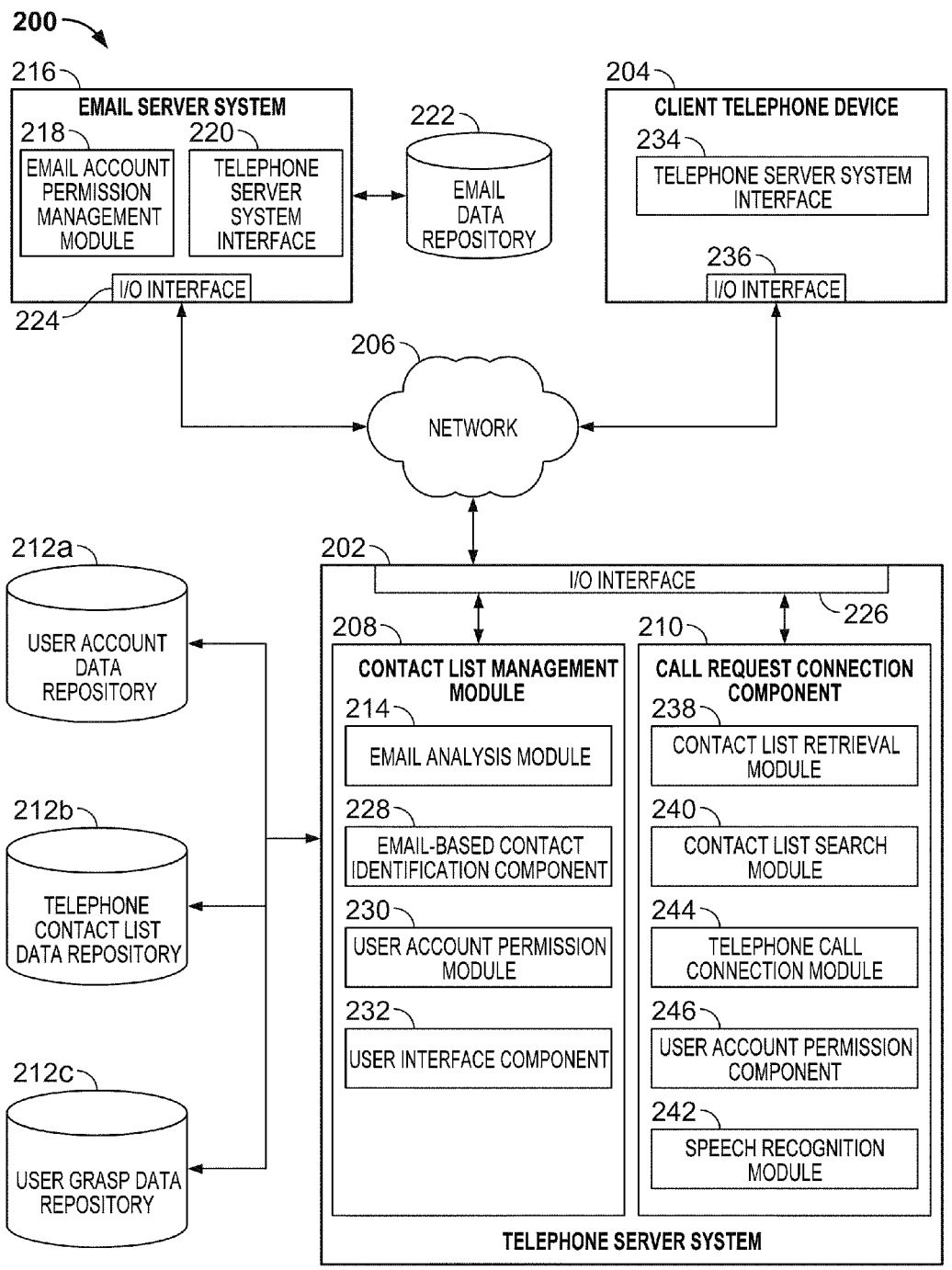
FIG. 2 is a diagram of an example system for generating and providing a remote list of telephone contacts.

FIG. 2 is a diagram of an example system 200 for generating and providing a remote list of telephone contacts. The system 200 is similar to the systems 100, 140, and 160 discussed above with regard to FIGS. 1A-C. The system 200 includes a telephone server system 202 that is configured to generate a list of telephone contacts for a user based upon email data associated with the user. The generated list of telephone contacts can be provided by the telephone server system 202 remote from and for use by a client telephone device 204 (e.g., a mobile telephone, a smart telephone, a VOIP telephone, a computer-implemented telephony application, a landline telephone, etc.) over a network 206 (e.g., a PSTN, a local area network (LAN), a wide area network (WAN), a cellular network, a wireless network, the Internet, an intranet, any combination thereof, etc.).

The telephone server system 202 can be a collection of one or more computer servers, such as a distributed server system, a dedicated server system, collocated server system, a rack-mounted server system, a telephony server system, etc. The server system 202 can include a contact list management module 208 that is configured to generate, update, and provide a user interface for managing list of telephone contacts. The server system can also include a call request connection component 210 that is configured to serve requests to provide telephone contact information and to initiate telephone connections using a list of telephone contacts maintained by the contact list management module 208.

The telephone server system 202 can be configured to access one or more data repositories 212a-c to generate and/ or provide a list of telephone contacts. The user account data repository 212a can store information regarding user accounts established with the telephone server system 202, such as a user's name, telephone number(s), rules regarding calls placed to the telephone number(s), list of other users permitted to call the telephone number(s), etc. The telephone contact list data repository 212b can store lists of telephone contacts for users. The user group data repository 212c can store information identifying groups of users that pertain to telephone contact lists. Membership in a group of users can be used as a way to easily share contact information across a group of users. For instance, if a user is a member of a group, then entries for all of the other members of the group can be added to the user's list of telephone contacts. A user may have to consent to membership in a group before being provided in a list of telephone contacts for other members of the group.

The contact list management module 208 can include an email analysis module 214 that is configured to analyze email data to identify potential contacts for addition to a list of telephone contacts. The email analysis module 214 can receive email data from an email server system 216. The email server system 216 includes an email account permission management module 218 that is configured to restrict access to a user's email data unless the user has provided permission for it to be shared with the telephone server system 202.

The email server system 216 also includes a telephone server system interface 220 that is configured to provide email data to the telephone server system 202. The telephone server system interface 220 can obtain email data from an email data repository 222 and can process the email data (e.g., redact portions of the email data, generate statistics based upon the email data, etc.) before providing it to the telephone server system 202. The email server system 216 can provide the email data to the telephone server system 202 through an input/output (I/O) interface 224 (e.g., Ethernet card, wireless network interface, etc.) for the email server system 216, the network 206, and an I/O interface 226 of the telephone server system 202.

Using email data from the email server system 216, the email analysis module 214 analyzes and identifies connections between users based upon the email data. The email analysis module 214 can provide the identified connections to an email-based contact identification component 228 that is configured to determine whether the identified user connections meet a minimum threshold for being added to a list of telephone contacts for a user. As described above with regard to FIG. 1B, the threshold for adding a contact to the list of contacts can vary for each user depending upon a variety of factors, such as a correlation between a user's email behavior and the user's telephone behavior, etc. Lists of telephone contacts generated by the email-based contact identification component 228 can be stored in the telephone contact list data repository 212b.

The contact list management module 208 also includes a user account permission module 230 that is configured to determine whether a user, possibly identified as a contact by the email-based contact identification component 228, has provided permission to be added to another user's list of telephone contacts. When a user has been identified for addition to a list of contacts and the user has not previously provided or declined permission, the user account permission module 230 can contact user for permission (e.g., send the user an email) regarding the possible list addition.

The contact list management module 208 is further depicted as containing a user interface component 232 that is configured to provide an interface for users to manage telephone contact lists. The user interface component 232 can provide interfaces for use by a variety of client applications (e.g., web browser, mobile telephone application, VOIP telephone application, etc.) and for use by a variety of client devices (e.g., mobile telephone, smart telephone, personal computer, etc.). A user can manage a variety of features through the interfaces provided by the user interface component 232, such as the user's list of telephone contacts (e.g., user can add and remove contacts from the list), the user's contact information (e.g., telephone number(s), name, etc.), rules for calling the user (e.g., send calls between 10:00 pm and 8:00 am to voicemail), a list of other users permitted to call the user, membership in groups, etc. The user interface component 232 can store information provided by the user in the data repositories 212a-c.

The client telephone device 204 can transmit requests to access and/or place telephone calls using a list of telephone contacts provided by the telephone server system 202. The client telephone device 204 includes a telephone server system interface 234 that is configured to communicate with the telephone server system 202 to transmit such requests. The telephone server system interface 234 can include a variety of components of the client telephone device 204 that receive input and/or output, such as a display, a touch-screen display, a keypad, a speaker, a microphone, an accelerometer, a mobile telephone application, etc. The telephone server system interface 234 can transmit a request to access and/or place a telephone call to the telephone server system 202 using an I/O interface 236 (e.g., telephone jack, cellular signal transmitter, Ethernet card, wireless signal transmitter, etc.) of the client telephone device 204 and the network 206.

Requests transmitted by the client telephone device 204 can be received by the telephone server system 202 with the I/O interface 226 and processed by the call request connection component 210. The call request connection component 210 includes a contact list retrieval module 238 that is configured to retrieve a list of telephone contacts for a user from the telephone contact list data repository 212b. The contact list retrieval module 238 can further be configured to verify an identity of a user of the client telephone device 204.

The call request connection component 210 can also include a contact list search module 240 that is configured to search a list of telephone contacts retrieved by the contact list retrieval module 238 for a contact specified by the client telephone device 204. For voice-based requests from the client telephone device 204, the contact list search module 240 can use a speech recognition module 242 to translate the request to text. The speech recognition module 242 can use a retrieved list of telephone contacts as a lexicon against which a voice-based request based request is translated, which may increase the efficiency with which an entry from a list of telephone contacts is identified from a voice-based request.

A telephone call connection module 244 of the call request connection component 210 can initiate a connection between the client telephone device 204 and a client telephone device of a requested user (not depicted). The connection between the two client devices can be initiated in a variety of ways. For example, the connection can be initiated by the call connection module 244 using a combination of VOIP protocols, HTTP media server proxies, VOIP gateways, and/or local colocation systems. The telephone call connection module 244 can check with a user account permission component 246 before initiating the connection to ensure that a user being called permits calls from a user of the client telephone device 204.

Figure 3A:
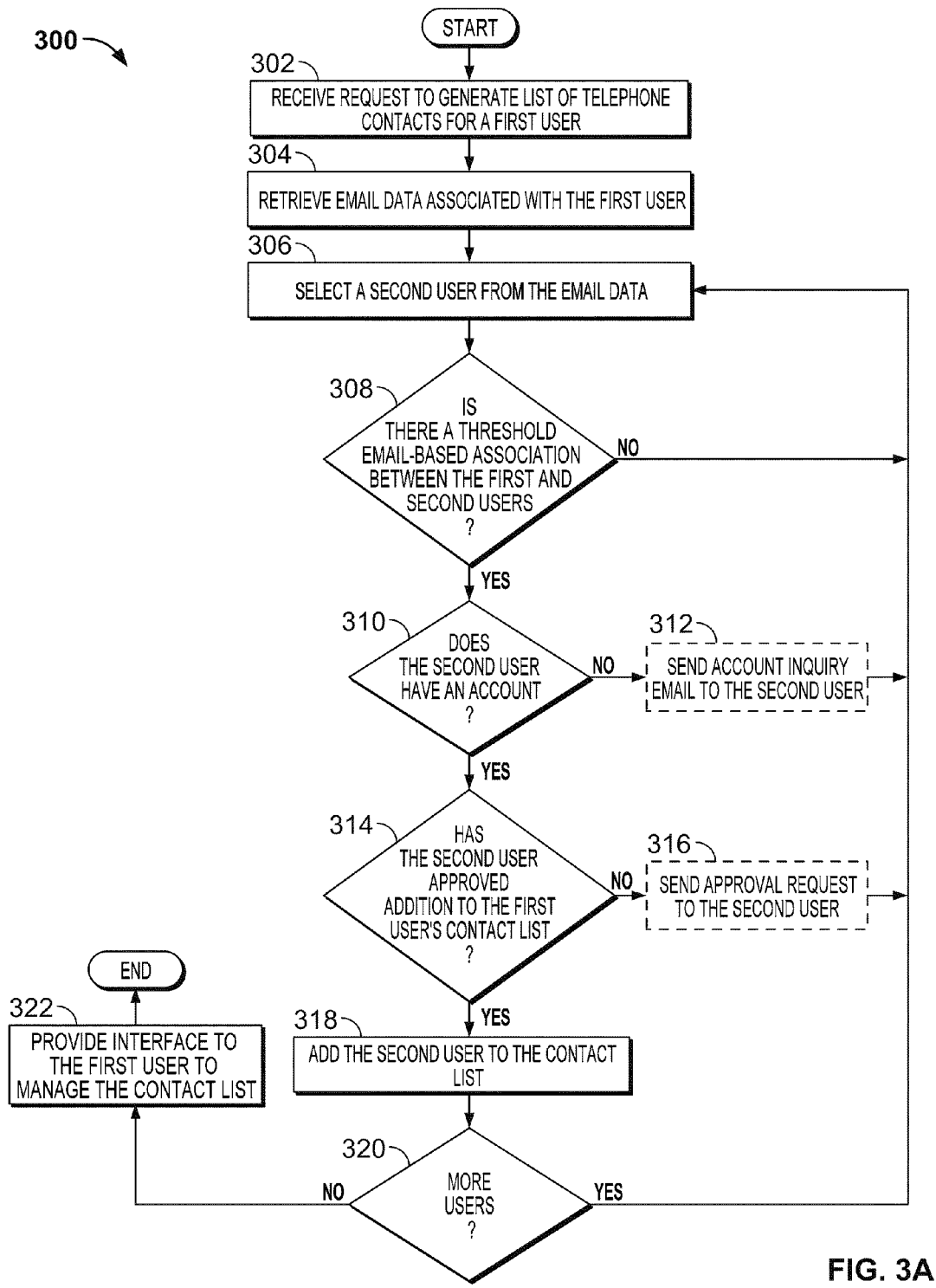
FIGS. 3A-B are flowcharts showing example techniques to generate and provide a remote list of telephone contacts.
Figure 3B:
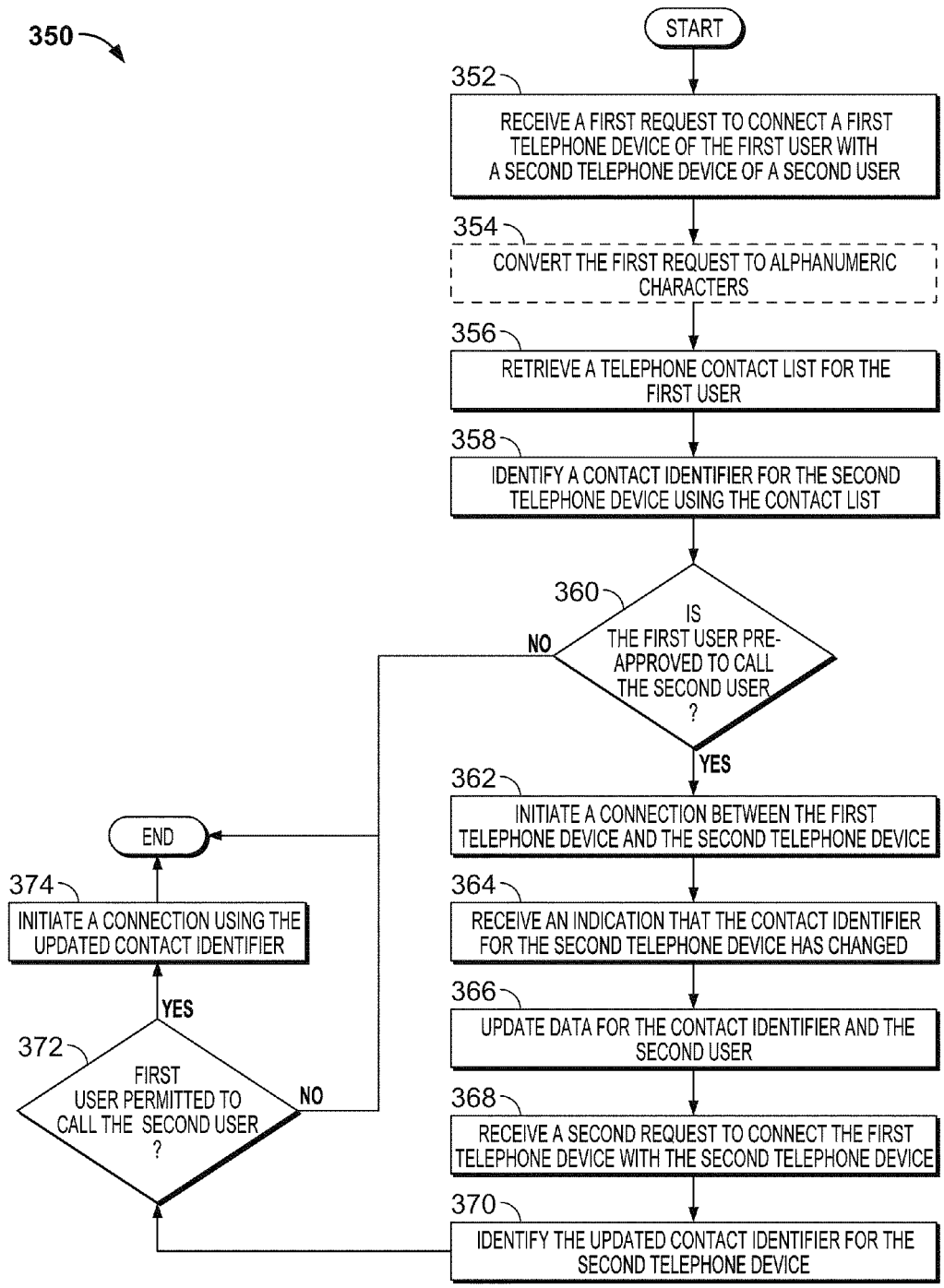

FIGS. 3A-B are flowcharts showing example techniques 300 and 350 to generate and provide a remote list of telephone contacts, respectively. The depicted example techniques can be performed by a variety of systems, such as the telephone server system 104, the telephone server system 144, the telephone server system 162, and the telephone server system 202, as described above with regard to FIGS. 1A-C and 2.

The example technique 300, as depicted in FIG. 3A, regards generating a list of telephone contacts based upon email data. The generated list of telephone contacts can be used to provide a list of telephone contacts that is remote to a telephone device, as described above with regard to FIGS. 1A-C. The technique 300 can be performed by a variety of systems, such as by the contact list management module 208 of the telephone server system 202. The technique 300 is similar to techniques for generating telephone contacts described above with regard to FIGS. 1A-B and 2.

At step 302, a request to generate a list of telephone contacts for a first user is received. For example, the first user can submit a request to the telephone server system 202 to generate a list of telephone contacts for the first user. The request can be generated by the telephone server system 202 itself or by another system (e.g., the email server system 216).

In response to the received request, email data associated with the first user is retrieved (step 304). For instance, email data associated with the first user is provided to the telephone server system 202 from the email server system 216).

The received email data can be analyzed and a second user can be selected from the email data for consideration as a telephone contact (step 306). At step 308, a determination is made as to whether there is a threshold email-based association between the first user and the second user, based upon the received email data. For example, the determination can examine, among a variety of factors, whether the first user and the second user have communicated frequently enough over email (and/or email-based chat, blog, video communication) to be considered to have a threshold association. The threshold association can be used to identify other users that the first user is likely to call by telephone and can be based upon a variety of factors, such as empirical data, a type of contact list that is being generated (e.g., business contacts, friends, etc.), a correlation between previously added contacts and telephone calls made by the first user, etc.

For example, the threshold association between the first and second users can include a threshold amount of email correspondence between a first email address associated with the first user and a second email address associated with the second user (e.g., the first and second users send email messages to each other). In another example, an email address of the second user being on a list of email contacts associated with the first user can provide the threshold association between the two users (e.g., the second user's email address is listed in an email address book of the first user). In a further example, there can be a threshold association between the first and second users when the first user has received an email that contains the email address of the second user (e.g., another user explicitly forwarded the contact information of the second user to the first user by email).

In an additional example, if the first user has explicitly identified that the second user should be added to the list of telephone contacts, a threshold association can be determined (e.g., the first user manually entered the second user's email address as a telephone contact). In another example, the first user and the second user both being members of the same group of users can provide a threshold association between the two users (e.g., the first user and the second user are part of a recreation soccer team group).

If there is a threshold email-based association between the first and second users, then a determination can be made as to whether the second user has an account (step 310). For example, step 310 can determine whether the second user has an account with the telephone server system 202 that is stored in the user account data repository 212b. The second user having an account indicates that the telephone server system 202 has a telephone number associated with an email address for the second user, which can enable the first user to call the second user with a list of telephone contacts (if the second user is added to the list). In some implementations, if the second user does not have an account, then an email inquiring about establishing an account can be sent to the second user (step 312).

When the second user has an account with the relevant system, then a determination can be made as to whether the second user has approved addition to a list of telephone contacts for the first user (step 314). For example, the second user may have explicitly indicated to the telephone server system 202 that the first user is permitted to place calls to the second user. In another example, presence of the first user on the second user's list of telephone contacts may provide a sufficient indication that the second user has approved being added to the first user's list of telephone contacts. In some implementations, if the second user has not approved addition to the first user's list of telephone contacts, then a request for approval can be sent to the second user (step 316).

At step 318, if the second user has provided approval, then the second user can be added to the list of contacts for the first user. If there are more users to consider as potential telephone contacts of the first user, then steps 306-318 can be repeated for the additional users to determine whether they should be added to the list of telephone contacts for the first user (step 320). If there are no more users to consider, then an interface can be provided to the first user for managing the generated list of telephone contacts (step 322). For example, the user interface component 232 of the telephone server system 202 can provide an interface for the user to add and/or remove entries from the generated list of telephone contacts.

The example technique 330, as depicted in FIG. 3B, regards providing a list of telephone contacts to a first user and initiating a telephone connection using the list of telephone contacts. The list of telephone contacts that is provided to the first user can be generated based upon email data, as described above with regard to technique 300. The technique 350 can be performed by a variety of systems, such as by the call request connection component 210 of the telephone server system 202. The technique 350 is similar to techniques for providing a list of telephone contacts to a user, as described above with regard to FIGS. 1A, 1C, and 2.

At step 352 of the technique 350, a first request to connect a first telephone device of the first user with a second telephone device of a second user is received. For example, the telephone server system 202 receives a request from the client telephone device 204 (associated with the first user) to initiate a telephone call between the client telephone device 204 and a telephone device associated with the second user.

In some implementations, the first request can be a verbal request from the first user. In such implementations, the first request is converted into alphanumeric characters (step 354). For example, the speech recognition module 242 can be used to convert the first request into alphanumeric characters.

A telephone contact list for the first user can be retrieved (step 356). For example, the call request connection component 210 can retrieve the list of telephone contacts for the first user from the telephone contact list data repository 212b. The first request can indicate an identity of the first user, which can be used to retrieve the appropriate list of telephone contacts.

Using the retrieved list of telephone contacts for the first user, a contact identifier for the second telephone device of the second user can be identified (step 358). For example, a telephone number of a mobile telephone that is registered with the telephone server system 202 for the second user can be identified using an email address for the second user, as provided by the list of contacts for the first user. As described above with regard to FIG. 1A, other unique identifiers can be used to identify a user on the list of contacts, such as a social network username, an online gaming community username, etc.

If the first user is pre-approved to call the second user (step 360), then a connection between the first telephone device of the first user and the second telephone device of the second user can be initiated (step 362). For example, as depicted in FIG. 1A, if "John Doe" has approved telephone calls from user A, then a telephone call between user A's mobile device 102 and John Doe's mobile device 130 can be initiated. If the first user is not pre-approved to call the second user, then the technique 350 can end. The telephone connection between the first telephone device and the second telephone device can be initiated so that the first telephone device is not aware of the telephone number of the second telephone device. For example, the connection can be initiated using a combination of VOIP protocols, HTTP media server proxies, VOIP gateways, and/or local colocation systems.

At step 364, an indication that the contact identifier for the second telephone device has changed is received. For example, the second user may use the user interface component 232 of the telephone server system 202 to update his/her user account information to reflect that the second user's telephone number has changed. In response to the received indication, data for the contact identifier and the second user is updated (step 366). For example, the user interface component 232 can update the second user's account, which can be stored in the user account data repository 212a, to include the new telephone number for the second user.

Similar to step 352, a second request to connect the first telephone device of the first user with the second telephone device of the second user is received (step 368). The updated contact identifier for the second telephone device can be identified using the list of telephone contacts for the first user (step 370). If there is permission for the first user to call the second user (step 372), then a connection between the first telephone device and the second telephone device can be initiated (step 374). For example, the first user can contact the second user after the second user's telephone number has changed without the first user having to update his/her list of telephone contacts or identify the second user in the second request any differently than in the first request.

Figure 4:
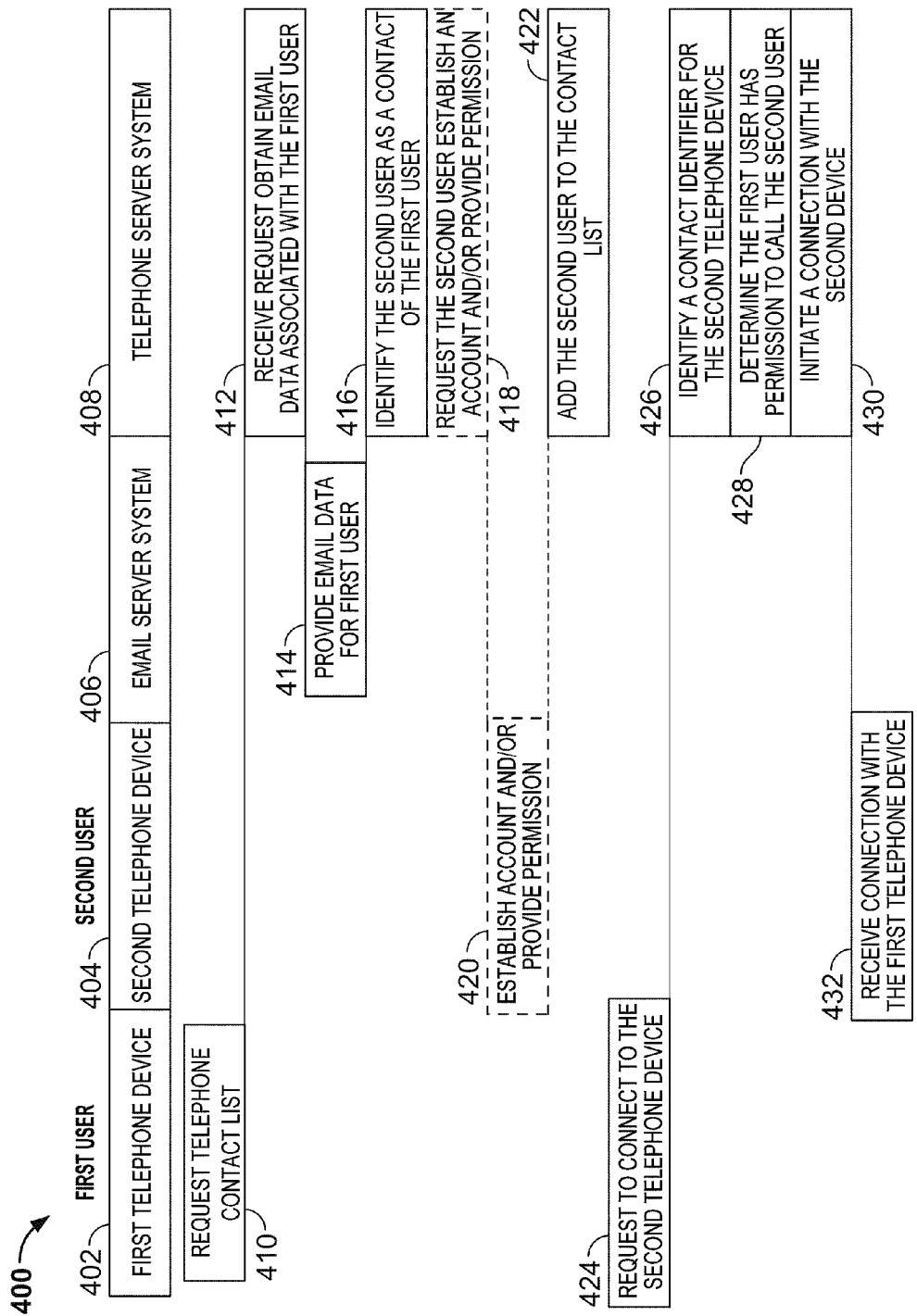
FIG. 4 is a timeline of an example process for generating and providing a remote list of telephone contacts.

FIG. 4 is a timeline of an example process 400 for generating and providing a remote list of telephone contacts. In the example process 400, a first user associated with a first telephone device 402 (e.g., telephone device 102, client telephone device 204) generates a list of telephone contacts using a telephone server system 408 (e.g., telephone server systems 104, 144, 162, 202). Additionally, the first user accesses the generated list of telephone contacts provided by the telephone server system 408 to initiate a telephone call with a second user associated with a second telephone device 404. The example process 400 is similar to the example techniques 300 and 350 described above with regard to FIGS. 3A-B, respectively.

At time 410, a request to generate a list of telephone contacts is transmitted by the first telephone device 402 to the telephone server system 408. The telephone server system 408 receives the request and transmits a request to obtain email data associated with the first user (time 412). As described above with regard to FIGS. 1-3, the telephone contact list for the first user can be generated based upon email data for the first user. The list of telephone contacts can be generated based upon other data as well, such as data reflecting interactions with other users on a social network.

An email server system 406 (e.g., email server system 216) receives the request for email data associated with the first user and provides the requested data to the telephone server system 408 (time 414). At time 416, the second user is identified as a contact of the first user based upon the received email data. In some implementations, a request can be sent to the second user for the second user to establish an account with the telephone server system 408 and/or to provide permission for the first user to call the second telephone device 404 of the second user (time 418). In such implementations, the second user can establish an account and/or provide permission, as depicted at time 420. Based upon the identification at time 416 (and the second user establishing an account or providing permission at time 420), the second user can be added to a list of contacts for the first user (time 422).

At time 424, the first telephone device 402 transmits a request to connect to the second telephone device using the list of telephone contacts. Based upon the request, the telephone server system 408 identifies a contact identifier (e.g., a telephone number, an IP address, etc.) for the second telephone device 404 using the list of telephone contacts for the first user (time 426). At time 428, the telephone server system 408 determines whether the first user has permission to call the second telephone device of the second user. If the first user is permitted to place the call, a connection with the second telephone device 404 can be initiated by the telephone server system 408 (time 430). In response to the initiated connection, the second telephone device 404 receives a connection with the first telephone device 402 (time 432). If the first user is not permitted to initiate the call to the second user, the telephone server system 408 can transmit information to the first telephone device 402 informing the first user that the second user does not allow the connection.

Figure 5:
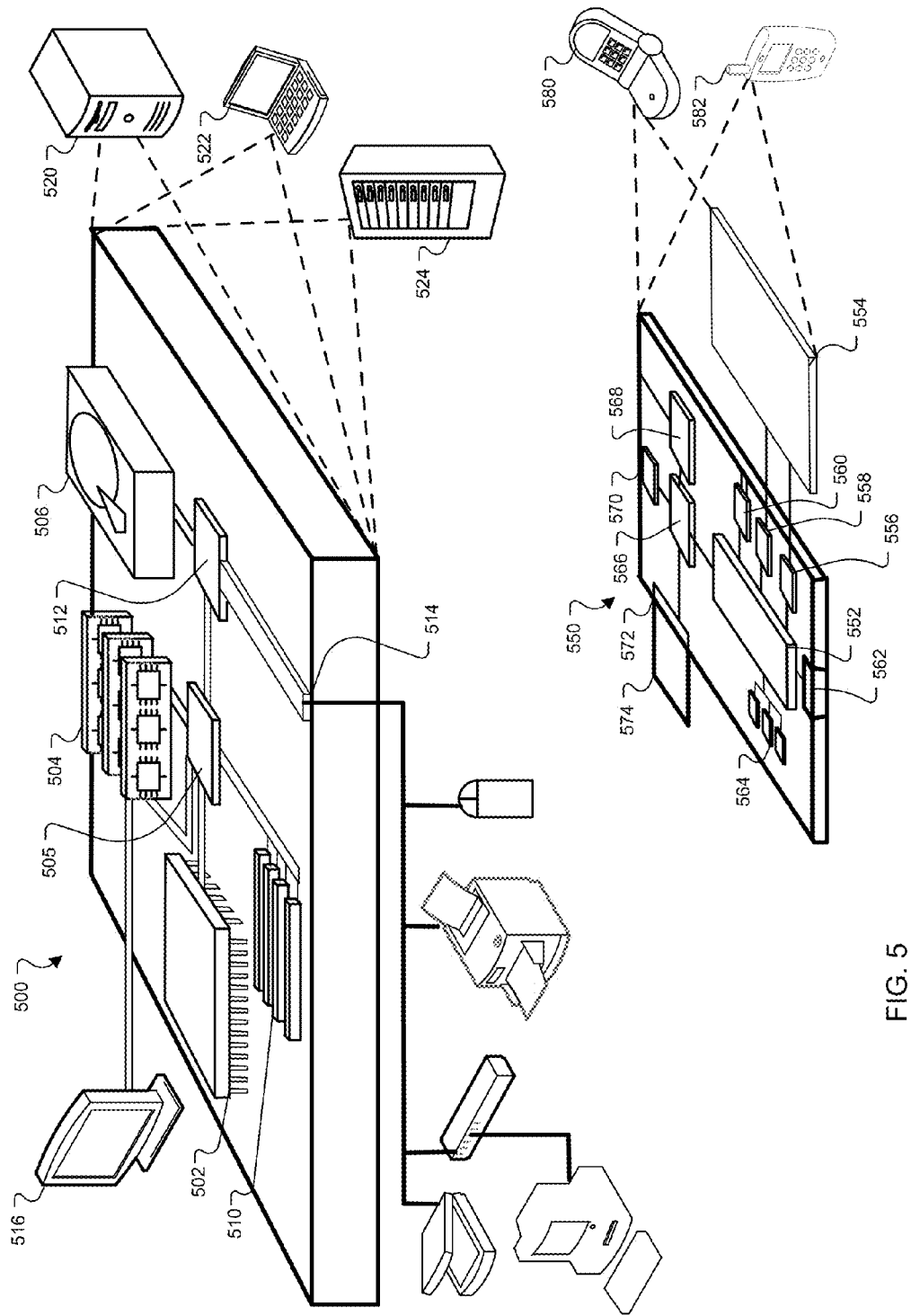
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for providing a remote list of telephone contacts may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
   generating, by a computer system, a group of telephone contacts for a first user, wherein the generating comprises:
      identifying, by the computer system, a second user as a telephone contact of the first user based upon a determination that the second user has at least a threshold email-based association with the first user; and
      in response to identifying the second user as a telephone contact of the first user, adding, by the computer system, a telephone contact entry for the identified second user to the group of telephone contacts for the first user, wherein the telephone contact entry includes i) a name of the second user, ii) a telephone number of a second telephone device that is associated with the second user, and iii) a unique identifier that is associated with the second user and that is different from the telephone number;
   providing, to a first telephone device that is associated with the first user, telephone contact information that identifies at least a portion of the group of telephone contacts for the first user, wherein the telephone contact information includes, at least, the name of the second user and the unique identifier that is associated with the second user;
   receiving, at the computer system and from the first telephone device, a first request to initiate a telephone call between the first telephone device and the second telephone device, wherein the first request includes the unique identifier from the telephone contact information;
   in response to receiving the first request:
      identifying, by the computer system, the telephone number of the second telephone device from the generated telephone contact entry using the unique identifier and the generated group of telephone contacts for the first user; and
      initiating, by the computer system, a telephone call between the first telephone device and the second telephone device using the identified telephone number.

2. The computer implemented method of claim 1, wherein the threshold email-based association includes a threshold level of email correspondence between a first email address associated with the first user and a second email address associated with the second user.

3. The computer implemented method of claim 1, wherein the threshold email-based association includes, for a first email address associated with the first user, a group of email contacts associated with a first email address containing a second email address associated with the second user.

4. The computer implemented method of claim 1, wherein the threshold email-based association includes the first user having identified an email address that is associated with the second user through an interface of the computer system.

5. The computer implemented method of claim 1, wherein the threshold email-based association includes a first email address that is associated with the first user and a second email address that is associated with the second user being part of a common group of email addresses.

6. The computer implemented method of claim 1, wherein the threshold email-based association includes a first email address that is associated with the first user having received an email that contains a second email address that is associated with the second user.

7. The computer-implemented method of claim 1, wherein generating the list of telephone contacts further comprises:
   determining, by the computer system, whether the second user has an account on the computer system, wherein an account on the computer system specifies information that identifies a second email address associated with the second user and the telephone number associated with the second telephone device,
   wherein adding the telephone contact entry for the identified second user to the group of telephone contacts is performed in response to determining that the second user has an account on the computer system.

8. The computer-implemented method of claim 1, wherein the telephone call between the first telephone device and the second telephone device is initiated such that the telephone number of the second device is not disclosed to the first user.

9. The computer-implemented method of claim 1, further comprising providing, by the computer system, an interface to the first user to view the generated group of telephone contacts, wherein the interface does not permit the first user to view telephone numbers for telephone devices associated with users on the group of telephone contacts.

10. The computer-implemented method of claim 1, further comprising determining, by the computer system, whether the second user has pre-approved telephone calls from the first user by indicating an intent to receive telephone calls from the first user;
    wherein initiating the telephone call between the first telephone device and the second telephone device is performed in response to determining that the second user has pre-approved telephone calls from the first user.

11. The computer-implemented method of claim 10, wherein the second user is determined to have pre-approved telephone calls from the first user when an account that is associated with the second user includes a designation that telephone calls associated with a first email address are pre-approved, wherein the first email address is associated with the first user.

12. The computer-implemented method of claim 10, wherein the second user is determined to have pre-approved telephone calls from the first user when a group of telephone contacts for the second user includes an entry associated with the first user.

13. The computer-implemented method of claim 1, wherein the received first request from the first user comprises a verbal request that identifies the second user by name.

14. The computer-implemented method of claim 13, further comprising:
    converting, by the computer system, the verbal request to an alphanumeric string of characters;
    determining, by the computer system, that the second user is specified in the verbal request by identifying the second user's name from names associated with entries in the generated telephone contact list.

15. The computer-implemented method of claim 1, wherein the received first request identifies the second user other than with the telephone number of the second telephone device.

16. The computer-implemented method of claim 1, further comprising:
   receiving, at the computer system, an indication that the telephone number for the second telephone device that is associated with the second user has changed;
   updating, by the computer system, the telephone contact entry that is associated with the second user to include the changed telephone number for the second telephone device;
   receiving, at the computer system, a second request to initiate a telephone call between the first telephone and the second telephone device, wherein the second request includes the same unique identifier that was included in the first request; and
   identifying, by the computer system, the changed telephone number of the second telephone device using the unique identifier included in the second request, the generated group of telephone contacts for the first user, and the updated telephone contact entry that is associated with the second user; and
   initiating, by the computer system, a a telephone call between the first telephone device and the second telephone device using the changed telephone number.

17. The computer-implemented method of claim 1, wherein the computer system comprises a telephone server system.

18. A system for placing telephone calls using a remote email address-based contact list, the system comprising:
   one or more servers;
   an interface to the one or more servers that is configured to receive a first request to initiate a telephone call between a first telephone device that is associated with a first user and a second telephone device that is associated with a second user, wherein the first request includes a unique identifier that is associated with the second user;
   a contact list management module that programmed to generate a group of telephone contacts for the first user by: identifying the second user as a telephone contact of the first user based upon a determination that the second user has at least a threshold email-based association with the first user, and adding a telephone contact entry for the identified second user to the group of telephone contacts for the first user, wherein the telephone contact entry includes i) a name of the second user, ii) a telephone number of a second telephone device that is associated with the second user, and iii) the unique identifier that is associated with the second user and that is different from the telephone number;
   a user interface component of the one or more servers to provide, for receipt by the first telephone device that is associated with the first user, telephone contact information that identifies at least a portion of the group of telephone contacts for the first user, wherein the telephone contact information includes, at least, the name of the second user and the unique identifier that is associated with the second user; and
   a call request processing component programmed to, in response to receiving the first request: identify the telephone number of the second telephone device from the generated telephone contact entry using the unique identifier and the generated group of telephone contacts for the first user, and to initiate a telephone call between the first telephone device and the second telephone device using the identified telephone number.

19. A system for placing telephone calls using a remote email address-based contact list, the system comprising:
   one or more servers;
   an interface to the one or more servers that is configured to receive a first request to initiate a telephone call between a first telephone device that is associated with a first user and a second telephone device that is associated with a second user, wherein the first request includes a unique identifier that is associated with the second user;
   a contact list management module that programmed to generate a group of telephone contacts for the first user by: identifying the second user as a telephone contact of the first user based upon a determination that the second user has at least a threshold email-based association with the first user, and adding a telephone contact entry for the identified second user to the group of telephone contacts for the first user, wherein the telephone contact entry includes i) a name of the second user, ii) a telephone number of a second telephone device that is associated with the second user, and iii) the unique identifier that is associated with the second user and that is different from the telephone number;
   a user interface component of the one or more servers to provide, for receipt by the first telephone device that is associated with the first user, telephone contact information that identifies at least a portion of the group of telephone contacts for the first user, wherein the telephone contact information includes, at least, the name of the second user and the unique identifier that is associated with the second user; and
   means for processing the request to connect the first telephone device with the second telephone device using a generated group of telephone contacts that is configured to, in response to receiving the first request: identify the telephone number of the second telephone device from the generated telephone contact entry using the unique identifier and the generated group of telephone contacts for the first user, and initiate a telephone call between the first telephone device and the second telephone device using the identified telephone number.

20. The system of claim 18, wherein:
   the interface is further configured to receive an indication that the telephone number for the second telephone device that is associated with the second user has changed;
   the contact list management module is further configured to update the telephone contact entry that is associated with the second user to include the changed telephone number for the second telephone device;
   the interface is further configured to receive a second request to initiate a telephone call between the first telephone and the second telephone device, wherein the second request includes the same unique identifier that was included in the first request; and
   the call request processing component is further configured to identify the changed telephone number of the second telephone device using the unique identifier included in the second request, the generated group of telephone contacts for the first user, and the updated telephone contact entry that is associated with the second user; and to initiate a telephone call between the first telephone device and the second telephone device using the changed telephone number.

21. The system of claim 19, wherein:
- the interface is further configured to receive an indication that the telephone number for the second telephone device that is associated with the second user has changed;
- the contact list management module is further configured to update the telephone contact entry that is associated with the second user to include the changed telephone number for the second telephone device;
- the interface is further configured to receive a second request to initiate a telephone call between the first telephone and the second telephone device, wherein the second request includes the same unique identifier that was included in the first request; and
- the means for processing the request is further configured to identify the changed telephone number of the second telephone device using the unique identifier included in the second request, the generated group of telephone contacts for the first user, and the updated telephone contact entry that is associated with the second user; and to initiate a telephone call between the first telephone device and the second telephone device using the changed telephone number.

* * * * *

UNITED STATES PATENT AND TRADEMARK OFFICE
CERTIFICATE OF CORRECTION

PATENT NO. : 8,503,629 B2
APPLICATION NO. : 12/732923
DATED : August 6, 2013
INVENTOR(S) : Brian Strope, Francoise Beaufays and Hy Murveit It is certified that error appears in the above-identified patent and that said Letters Patent is hereby corrected as shown below:

In the Claims:

Column 23, line 26, in Claim 16, after "a" delete "a".

Signed and Sealed this
Twenty-second Day of October, 2013

Teresa Stanek Rea
*Deputy Director of the United States Patent and Trademark Office*